United States Patent [19]
Kushmaul et al.

[11] Patent Number: 5,186,075
[45] Date of Patent: Feb. 16, 1993

[54] STEERING WHEEL FOR MOTOR VEHICLE

[75] Inventors: Thomas R. Kushmaul, Springfield; Barry C. Worrell, Miamisburg, both of Ohio

[73] Assignee: General Motors Corporation, Detroit, Mich.

[21] Appl. No.: 887,031

[22] Filed: May 22, 1992

[51] Int. Cl.[5] .................. B62D 1/04; G05G 1/10; B21D 39/00
[52] U.S. Cl. ..................... 74/552; 29/894.1; 228/173.4
[58] Field of Search .............. 74/552, 558; 29/894.1; 228/173.4, 173.5; 428/36; 264/275

[56] References Cited

U.S. PATENT DOCUMENTS

| | | | |
|---|---|---|---|
| 1,646,974 | 10/1927 | Moyer . | |
| 2,007,597 | 7/1935 | Dean | 29/155 |
| 2,192,904 | 3/1940 | Ferris | 29/148.2 |
| 2,194,272 | 3/1940 | Blu | 219/10 |
| 2,642,652 | 6/1953 | Davis | 29/148 |
| 2,732,618 | 1/1956 | Schwinn | 29/482 |
| 2,744,429 | 5/1956 | Seely | 228/173.4 |
| 2,892,359 | 6/1959 | Overman | 74/484 |
| 3,001,275 | 9/1961 | Rehrig | 228/173.5 |
| 3,583,255 | 6/1971 | Curcuru | 74/552 |
| 4,011,643 | 3/1977 | Muller et al. | 74/552 |
| 4,047,450 | 9/1977 | Lecart et al. | 74/552 |
| 4,070,126 | 1/1978 | George | 403/271 |
| 4,197,028 | 4/1980 | George | 403/208 |
| 4,598,002 | 7/1986 | Kimura | 428/36 |
| 4,625,578 | 12/1986 | Nishijima | 74/552 |
| 4,811,472 | 3/1989 | Kobayashi | 264/275 |
| 4,892,006 | 1/1990 | Endo et al. | 74/552 |
| 5,090,477 | 2/1992 | Sprow et al. | 228/173.4 X |

FOREIGN PATENT DOCUMENTS

| | | | |
|---|---|---|---|
| 1215452 | 4/1960 | France . | |
| 262700 | 2/1929 | Italy | 74/552 |
| 525293 | 8/1940 | United Kingdom | 74/552 |
| 2243204 | 10/1991 | United Kingdom | 74/552 |

Primary Examiner—Vinh T. Luong
Attorney, Agent, or Firm—Saul Schwartz

[57] ABSTRACT

A motor vehicle steering wheel and method, the steering wheel including a circular rim made from a hollow, seam-welded steel tube and a plurality of spokes made from solid steel rods. The seam-welded tube is indented in the center thereof perpendicular to the plane of the rim to form a plurality of integral troughs elongated in the circumferential direction of the rim and each flanked on opposite sides by a pair of integral resistance welding projections having inverted U-shape cross sections for structural rigidity. The spokes are arrayed across respective ones of the troughs in point contact with the corresponding ones of the resistance welding projections. The spokes are pressed against the resistance welding projections while electric current passes between the two to resistance weld the spokes to the hollow metal tube at the resistance welding projections.

1 Claim, 2 Drawing Sheets

STEERING WHEEL FOR MOTOR VEHICLE

FIELD OF THE INVENTION

This invention relates to steering wheels for motor vehicles.

BACKGROUND OF THE INVENTION

Typical motor vehicle steering wheels have circular steel rims and steel spokes covered by molded foam pads. In connecting the spokes to the rim, it has been common practice to form a plurality of raised projections on the ends of the spokes and to resistance weld the spokes to the rim by pressing the outside surface of the rim against the raised projections while passing electric current across the interface between the projections and the rim. A prior steering wheel has been proposed in which the projections on the spokes have concavities or multiple points of engagement to increase the area of contact between the spokes and rim and also to assist in positioning the rim and spokes in preparation for welding. In other prior steering wheels, where the spokes are solid bars and the rim is a ring made of hollow steel tube, the tube is internally reinforced by solid steel slugs installed in the tube before the latter is formed into its ring-shape and welded closed. The slugs prevent distortion of the tubular rim during resistance welding. A steering wheel and method according to this invention is a novel alternative to the aforesaid prior proposals.

SUMMARY OF THE INVENTION

This invention is a new and improved motor vehicle steering wheel and method of making the same, the steering wheel including a rim in the form of an endless ring made from hollow, seam-welded steel tube and a plurality of spokes made from solid steel bars. A plurality of projection welding pads are formed on the rim, each pad including a pair of parallel welding projections formed by indenting a trough in the center of the seam-welded tube perpendicular to the plane of the ring. Each welding projection has an inverted U-shaped cross section and is elongated in the circumferential direction of the ring. The spokes are arrayed across respective ones of the troughs in point contact with corresponding pairs of welding projections. The spokes are pressed against the welding projections as electric current is passed between the spokes and the rim to effect resistance welding of the spokes to the rim. The inverted U-shape cross sections of the welding projections render the projections resistant to beam bending during welding to minimize distortion of the rim.

DESCRIPTION OF A PREFERRED EMBODIMENT

Figure 1:
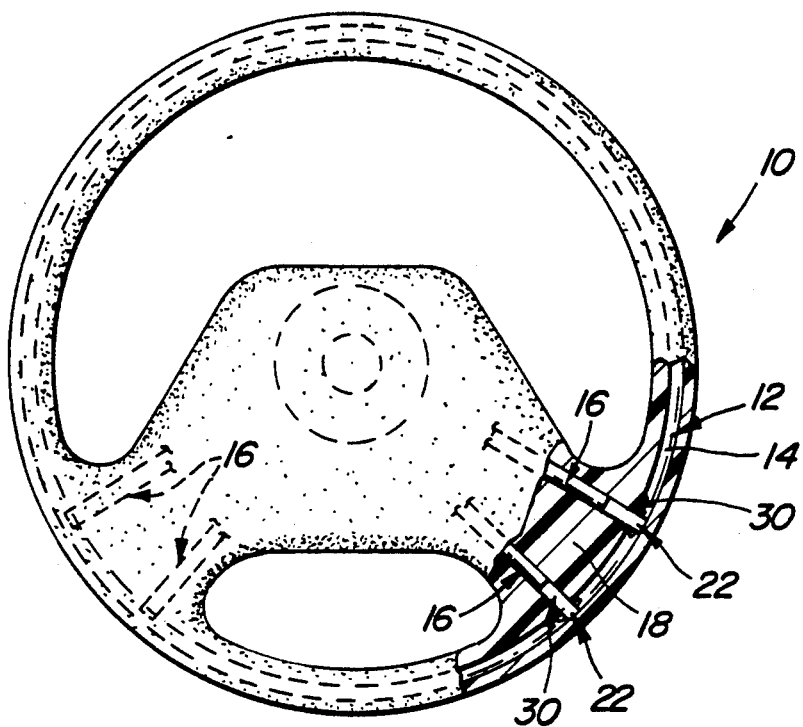
FIG. 1 is a partially broken-away view of a motor vehicle steering wheel according to this invention.

Referring to FIG. 1, a motor vehicle steering wheel (10) according to this invention includes a rim (12) made preferably from a hollow, seam-welded steel tube (14) and a plurality of structural spokes (16) made preferably from solid steel bars. The spokes are connected to a hub, not shown, at the center of the steering wheel through which the steering wheel is mounted on a steering shaft in the usual fashion. Connection of the spokes to the hub forms no part of this invention. The steering wheel further includes a conventional, schematically illustrated cushion or pad (18) which covers the rim and the spokes so that the steering wheel has a pleasing appearance and is comfortable to grip.

Figure 2:
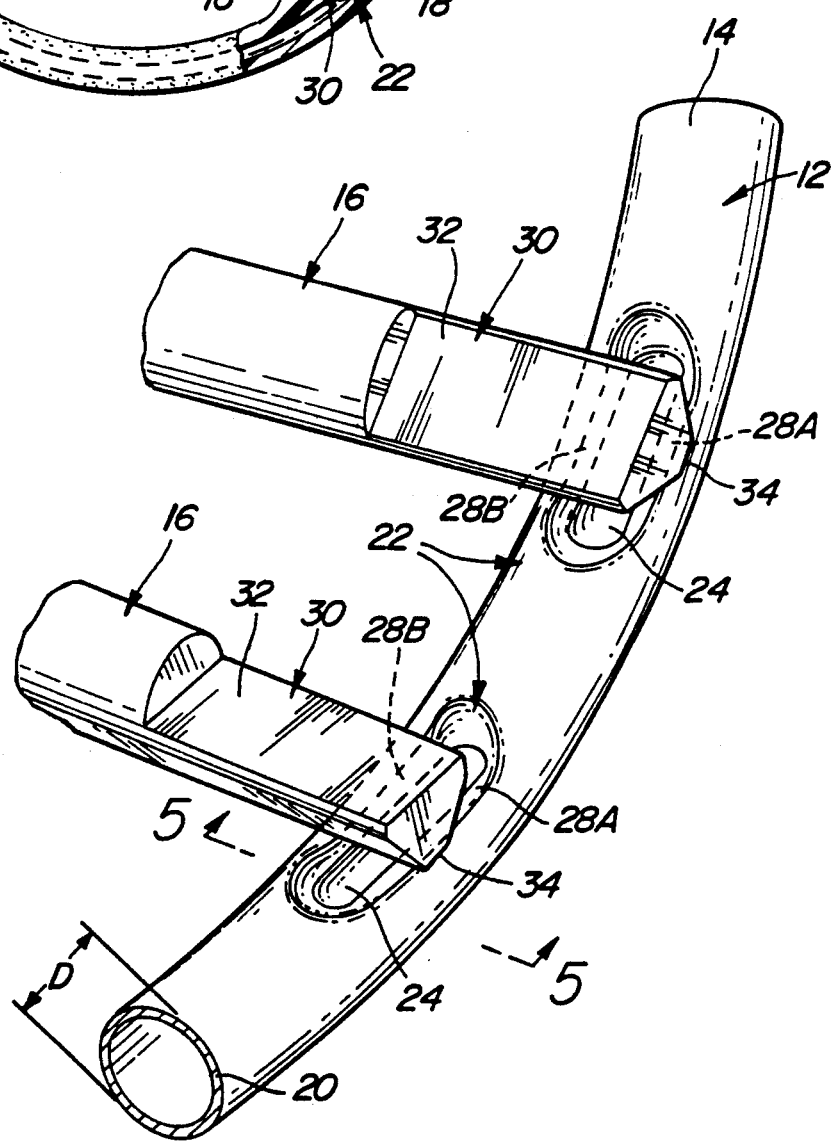
FIG. 2 is a fragmentary, perspective view of a portion of FIG. 1.
Figure 3:
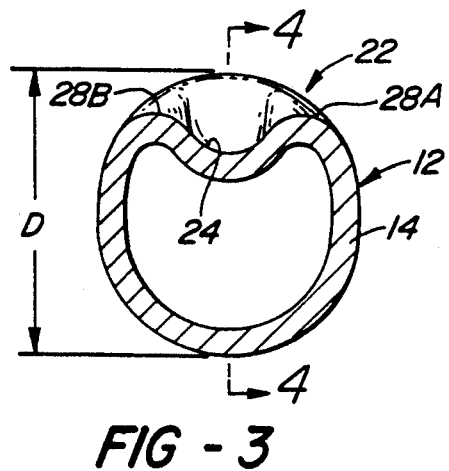
FIG. 3 is a sectional view of a rim of the steering wheel according to this invention.
Figure 4:
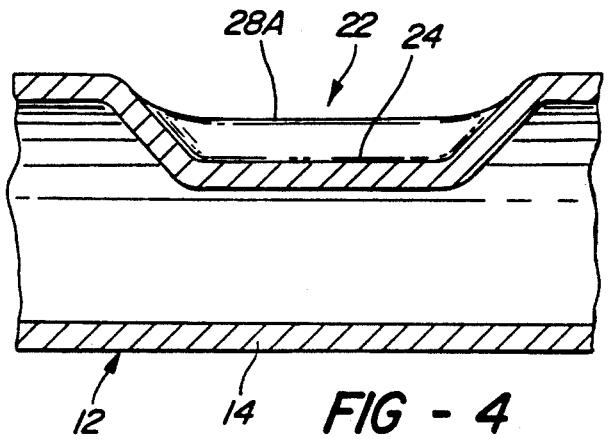
FIG. 4 is a sectional view taken generally along the plane indicated by lines 4—4 in FIG. 3.
Figure 6:
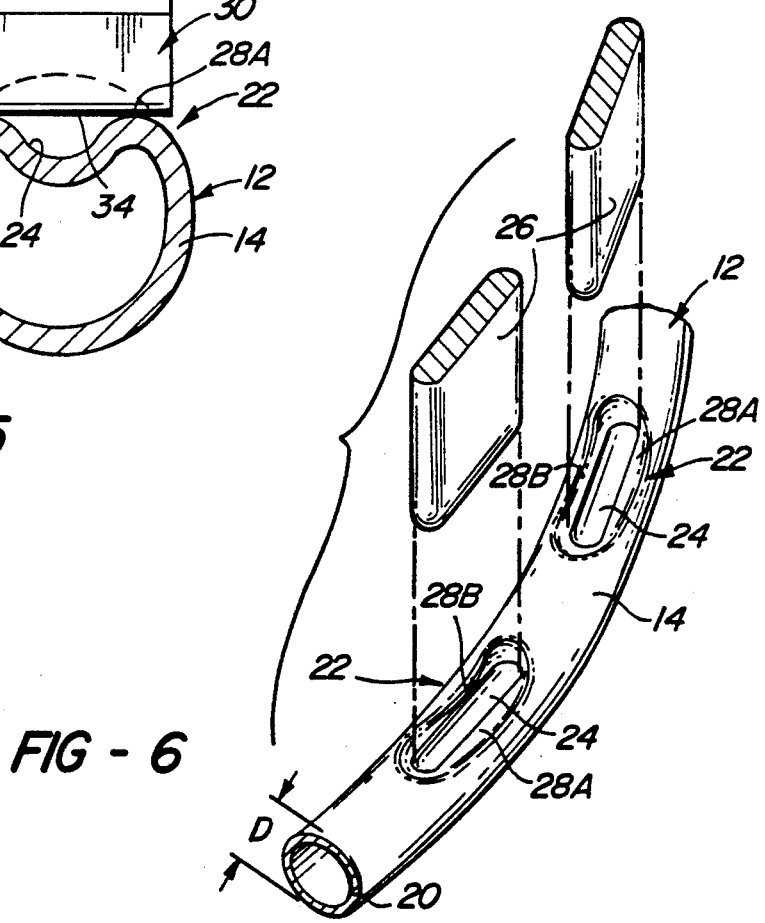
FIG. 6 is a fragmentary perspective view of a portion of a steering wheel according to this invention illustrating a step in the method according to this invention.

The seam-welded steel tube (14) has a circular cross section (20) of diameter D, FIGS. 2, 3 and 6. The tube is formed or bent into a circular or near-circular ring and closed by welding abutting ends, not shown, together. A plurality of integral, resistance welding pads (22) are formed on the tube (14) for connection of the spokes (16) to the rim (12).

Each of the resistance welding pads is formed by indenting a concave or outwardly facing trough (24) in the center of the seam-welded tube (14) perpendicular to the plane of the rim to a depth of about 25% of diameter D of the tube. The troughs (24) are elongated in the circumferential direction of the rim to exceed the diameters of the spokes (16). As the troughs are indented, for example by a flat, round-nosed punch (26), FIG. 6, the wall of the seam-welded tube (14) rolls inwardly on opposite sides of the punch to define a pair of parallel, elongated welding projections (28A-B) which also exceed the diameters of the spokes in the circumferential direction of the rim (12).

Figure 5:
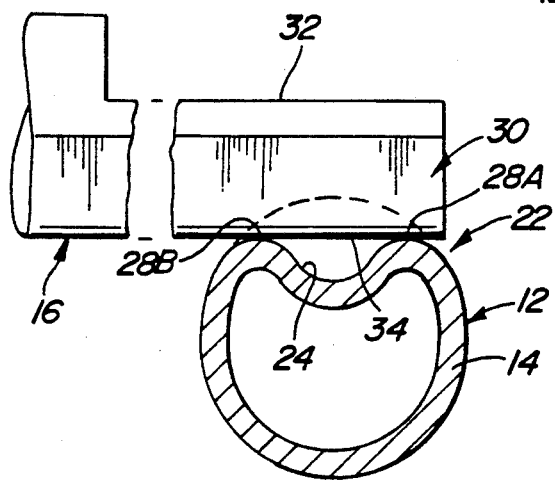
FIG. 5 is a sectional view taken generally along the indicated by lines 5—5 in FIG. 2.

Each of the welding projections (28A-B) has an inverted U-shaped cross section, FIGS. 3 and 5, and is wholly integral with the surrounding portions of the tube for maximum structural integrity, FIGS. 2-5. In order to assure that the wall of the seam-welded tube folds inward to form the welding projections (28A-B) instead of bulging outward during indenting of the troughs (24), the rim may be set in a circular groove, not shown, in a mold-like holding fixture for temporary, external reinforcement.

As seen best in FIGURES 2 and 5, the solid steel spokes (16) may each be coined at a distal end (30) to define a flat (32) for engagement by a welding electrode, not shown, and to define a rounded welding side (34) opposite the flat (32). In connecting the spokes (16) to the rim (12), the spokes are arrayed across respective ones of the troughs with their respective rounded welding sides (34) in point contact with corresponding ones of the welding projections (28A-B). Welding electrodes, not shown, positioned against the flats (32) on the spokes (16), press the spokes against the welding projections perpendicular to the plane of the rim (12) and electric current is passed between the spokes and the rim.

The welding projections (28A-B) concentrate the electric current to a current density high enough to locally heat the spokes and the rim to fusion temperature. As the fusion temperature is reached, the spokes are forced down into the welding projections. The welding projections maintain current density at a sufficiently high level for fusion until termination of the welding operation which is characterized by penetration of the spokes into the welding projection to about 33 percent of the diameters of the spokes.

The welding projections are superior at maintaining high current density relative to simply forcing the spokes against the outside diameter of the tube (14). In addition, the inverted U-shapes of the welding projections (28A-B) reinforce the projections against beam bending under the force of the welding electrode urging the spokes (16) against the welding projections. Accordingly, the welding projections resist distortion of the seam-welded tube (14) in the area near the fusion zone which area necessarily achieves an elevated temperature below the fusion temperature.

The embodiments of the invention in which an exclusive property or privilege is claimed are defined as follows:

1. A motor vehicle steering wheel comprising:
   a rim made from a hollow metal tube shaped into an endless ring,
   a plurality of solid metal bars defining a plurality of spokes of said steering wheel, and
   means on said rim defining a plurality of integral resistance welding pads each including a trough in the center of said hollow metal tube elongated in said circumferential direction of said endless ring and a pair of integral resistance welding projections on opposite sides of said trough each having an inverted U-shaped cross section and being elongated in the circumferential direction of said endless ring,
   each of said spokes being arrayed across respective ones of said troughs in point contact with corresponding ones of said resistance welding projections and resistance welded to said hollow metal tube at said resistance welding projections.

* * * * *